US010156268B2

(12) United States Patent
Cassell et al.

(10) Patent No.: US 10,156,268 B2
(45) Date of Patent: Dec. 18, 2018

(54) BOOT WITH INSERT

(71) Applicant: GKN Driveline North America, Inc., Auburn Hills, MI (US)

(72) Inventors: Robert L. Cassell, Lake Orion, MI (US); Robert Paladichuk, Lancaster, NY (US); Eric J. LaMothe, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 15/507,471

(22) PCT Filed: Sep. 3, 2015

(86) PCT No.: PCT/US2015/048378
§ 371 (c)(1),
(2) Date: Feb. 28, 2017

(87) PCT Pub. No.: WO2016/036964
PCT Pub. Date: Mar. 10, 2016

(65) Prior Publication Data
US 2017/0248170 A1    Aug. 31, 2017

Related U.S. Application Data

(60) Provisional application No. 62/175,604, filed on Jun. 15, 2015, provisional application No. 62/045,281, filed on Sep. 3, 2014.

(51) Int. Cl.
*F16D 3/84* (2006.01)
(52) U.S. Cl.
CPC ........ *F16D 3/845* (2013.01); *F16D 2003/846* (2013.01)

(58) Field of Classification Search
CPC ...... F16D 3/845; F16D 3/84; F16J 3/04; F16J 3/042; B29C 49/20
See application file for complete search history.

(56) References Cited

U.S. PATENT DOCUMENTS 3,248,955 A * 5/1966 Templeton ............. B60G 7/005
277/635
4,060,154 A 11/1977 Smith
(Continued)

FOREIGN PATENT DOCUMENTS

CN 104334901 A 2/2015
DE 19956591 C1 7/2001
(Continued)

OTHER PUBLICATIONS

Written Opinion & International Search Report for PCT/US2015/048378 dated Nov. 25, 2015, 14 pages.

*Primary Examiner* — Eugene G Byrd
(74) *Attorney, Agent, or Firm* — Jennifer M. Brumbaugh; Reising Ethington P.C.

(57) ABSTRACT

A boot assembly for a constant velocity joint includes a boot having a neck portion arranged to be received over a shaft that is coupled to the constant velocity joint, and a retainer or insert which may include a vent. The retainer or insert may be carried by the neck portion and has at least one flex feature to facilitate flexing thereof. The insert may have at least one projection that extends radially inwardly from the neck portion and defines part of an inner surface of the boot, or at least one vent path defined therein to facilitate venting of one or more chambers defined at least in part by the boot.

27 Claims, 9 Drawing Sheets

(56) References Cited

U.S. PATENT DOCUMENTS

| | | | |
|---|---|---|---|
| 5,015,002 A * | 5/1991 | Goodman | F16F 9/38 139/109 |
| 5,649,779 A | 7/1997 | Martin | |
| 6,220,969 B1 | 4/2001 | Lilley | |
| 7,488,259 B2 * | 2/2009 | Sueoka | B29C 45/14336 464/175 |
| 7,695,373 B1 * | 4/2010 | Billett | F16J 3/042 277/636 |
| 8,287,393 B2 * | 10/2012 | Dao | F16D 3/226 464/173 |
| 2004/0036231 A1 * | 2/2004 | Neviani | F16D 3/845 277/634 |
| 2004/0056434 A1 * | 3/2004 | Wolf | F16D 3/845 277/634 |
| 2005/0051972 A1 * | 3/2005 | Wang | F16D 3/845 277/634 |
| 2006/0049584 A1 * | 3/2006 | Sueoka | B29C 45/14336 277/635 |
| 2006/0086457 A1 * | 4/2006 | Ohshita | B29C 66/13 156/272.8 |
| 2006/0170141 A1 | 8/2006 | Wette | |
| 2007/0042827 A1 * | 2/2007 | Deisinger | F16D 3/845 464/175 |
| 2007/0149298 A1 * | 6/2007 | Wormsbaecher | F16D 3/845 464/145 |
| 2007/0166096 A1 | 7/2007 | Lim et al. | |
| 2007/0178978 A1 | 8/2007 | Boutin | |
| 2008/0153608 A1 | 6/2008 | Patrascu et al. | |
| 2009/0115142 A1 * | 5/2009 | Kuczera | B29C 73/22 277/634 |
| 2010/0227699 A1 * | 9/2010 | Cassell | F16D 3/845 464/173 |
| 2012/0040765 A1 * | 2/2012 | Takabe | F16D 3/845 464/175 |
| 2013/0244798 A1 | 9/2013 | Oh | |
| 2014/0179449 A1 * | 6/2014 | Miller | F16D 3/845 464/175 |

FOREIGN PATENT DOCUMENTS

| | | | | |
|---|---|---|---|---|
| FR | 2611836 A1 | | 9/1988 | |
| GB | 2340900 | | 3/2000 | |
| JP | H10159988 A | | 6/1998 | |
| JP | 2004263730 A | * | 9/2004 | ............ F16D 3/845 |
| JP | 2007092844 A | | 4/2007 | |
| JP | 2014095467 A | * | 5/2014 | ............ B29C 45/14 |
| WO | WO2006074669 A1 | | 7/2006 | |

* cited by examiner

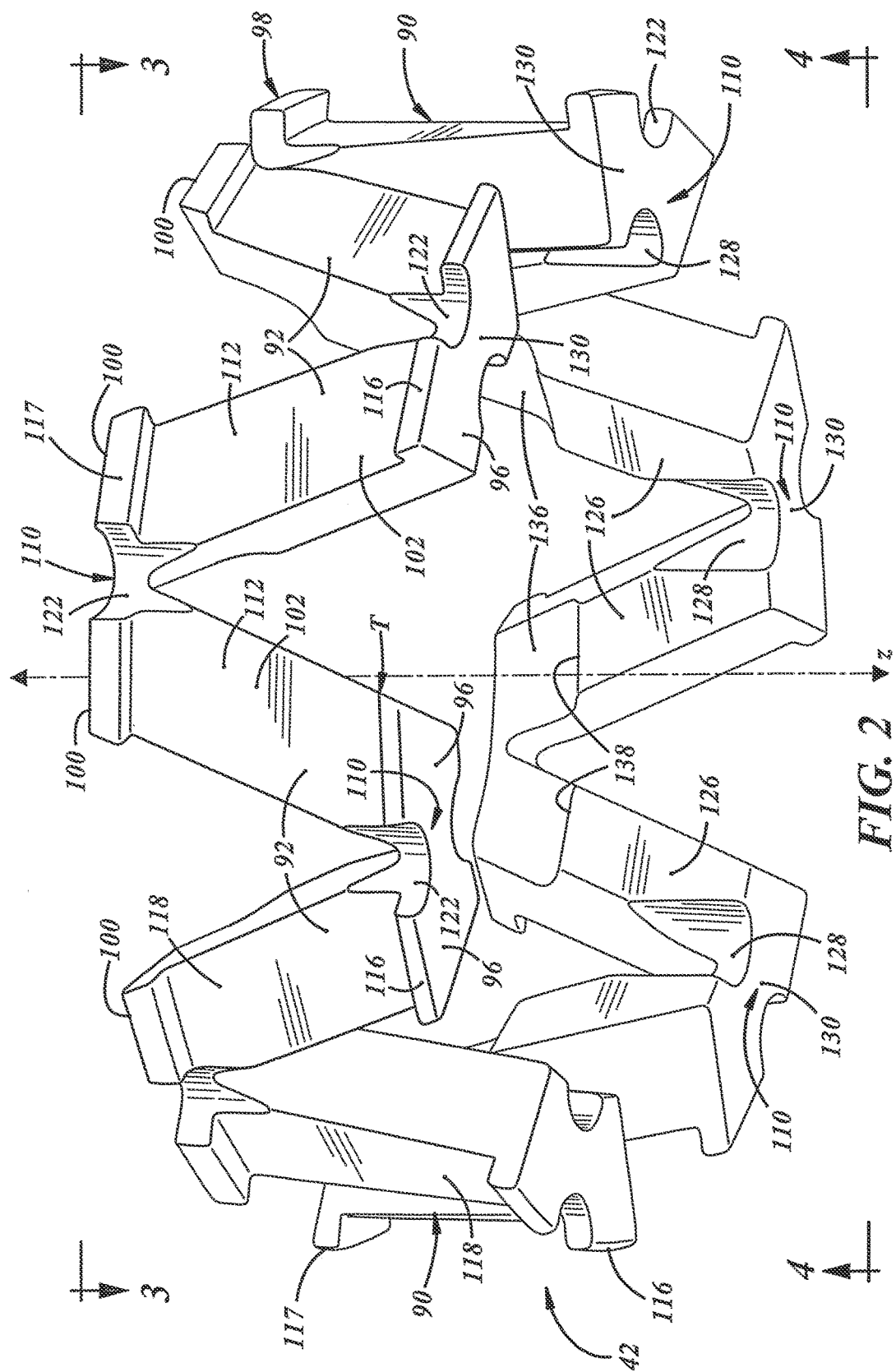

US 10,156,268 B2

BOOT WITH INSERT

REFERENCE TO COPENDING APPLICATIONS

This application claims the benefit of U.S. Provisional Patent Application Ser. Nos. 62/045,281 filed Sep. 3, 2014 and 62/175,604 filed Jun. 15, 2015, which are incorporated herein by reference in their entireties.

TECHNICAL FIELD

The present disclosure relates generally to a boot or boot assembly, such as for a constant velocity joint, where the boot is retained on the constant velocity joint, a mating shaft, or both.

BACKGROUND

Constant velocity joints (CV joints) are common components in vehicles. CV joints are often employed where transmission of a constant velocity rotary motion is desired or required and are typically greased or otherwise lubricated for the life of the component. The joints are preferably sealed to retain the lubricant inside the joint while keeping contaminants and foreign matter, such as water and dirt, out of the joint. A boot, which may be made of rubber, thermoplastic, silicone material, or the like, usually encloses portions of the CV joints. The boot provides a flexible barrier to retain the grease in the joint so as to reduce friction and extend the life of the joint.

Typically, the boot includes generally cylindrical ends that overlap portions of the CV joint and a shaft coupled to the CV joint. For example, a boot may extend between an outer race and an inner race of the CV joint, or from one of the inner and outer races to a shaft that is coupled to the CV joint. The boot ends are clamped to the CV joint and shaft to retain the boot firmly in position and prevent or inhibit leakage of the lubricant out of the boot. Annular clamps have been used to clamp the boot ends and these clamps are circumferentially continuous, or solid rings. The solid clamp rings are often formed by welding together adjacent ends of material bent into a ring shape. The solid clamp rings are expanded over the outer surface of the boot and allowed to contract to compress the boot against the CV joint or shaft.

SUMMARY

In at least some implementations, a vent insert for a boot of a constant velocity joint includes a body having at least one flex feature to facilitate flexing of the body and a vent feature adapted to permit venting of the boot through the insert. The body may be further arranged relative to the boot to bear a clamping load and maintain a vent path in the boot.

In at least some implementations, a boot for a constant velocity joint, includes a body defining part of a first chamber, a neck portion and has a vent insert. The neck portion is arranged to be clamped to a shaft and includes at least one vent passage communicating with the first chamber. The vent insert is carried by the neck portion and configured to prevent the neck portion from collapsing and thereby blocking said communication of said vent passage with said first chamber.

In at least some implementations, a boot assembly for a constant velocity joint includes a boot having a neck portion arranged to be received over a shaft that is coupled to the constant velocity joint, and a retainer. The retainer is carried by the neck portion and has at least one flex feature to facilitate flexing of the retainer. The retainer has at least one projection that extends radially inwardly from the neck portion and defines part of an inner surface of the boot. In some implementations, the retainer may be integrated into the boot, such as by overmolding the retainer into the boot when the boot is formed.

In at least some implementations, the shaft has a boot location feature and the retainer may have at least one flex feature to facilitate expansion of the retainer and a projection that extends radially inwardly from the neck portion and is adapted to be received within the boot location feature to retain the position of the boot relative to the shaft. A portion of the boot material may be trapped against a portion of the shaft to provide a seal between them.

BRIEF DESCRIPTION OF THE DRAWINGS

The following detailed description of preferred implementations and best mode will be set forth with regard to the accompanying drawings, in which:

FIG. 2 is a perspective view of an embodiment of a vent insert for a boot of the constant velocity joint shown in FIG. 1;

DETAILED DESCRIPTION

Figure 1:
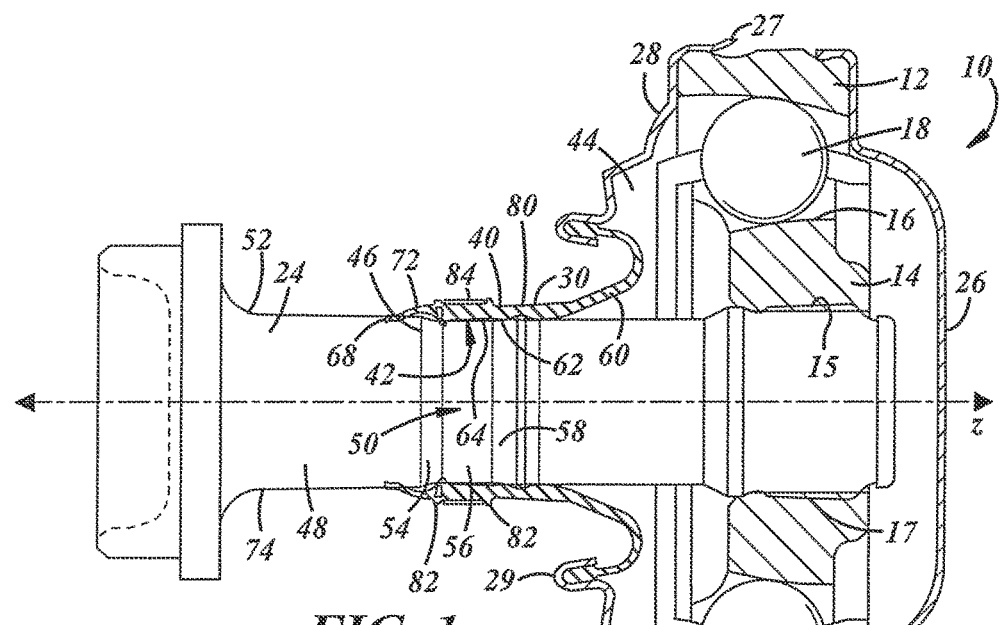
FIG. 1 illustrates a partial sectional view of a constant velocity joint.
Figure 3:
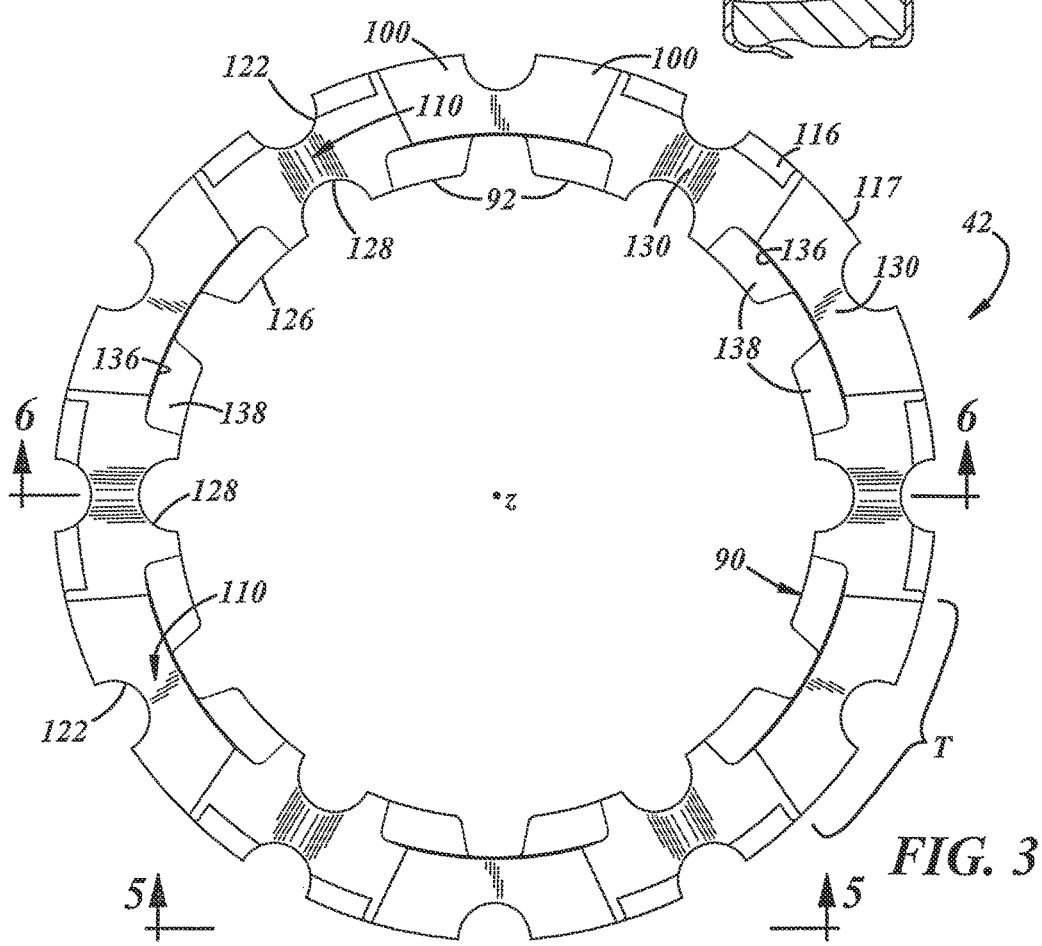
FIG. 3 is a top view of the insert shown in FIG. 2.
Figure 4:
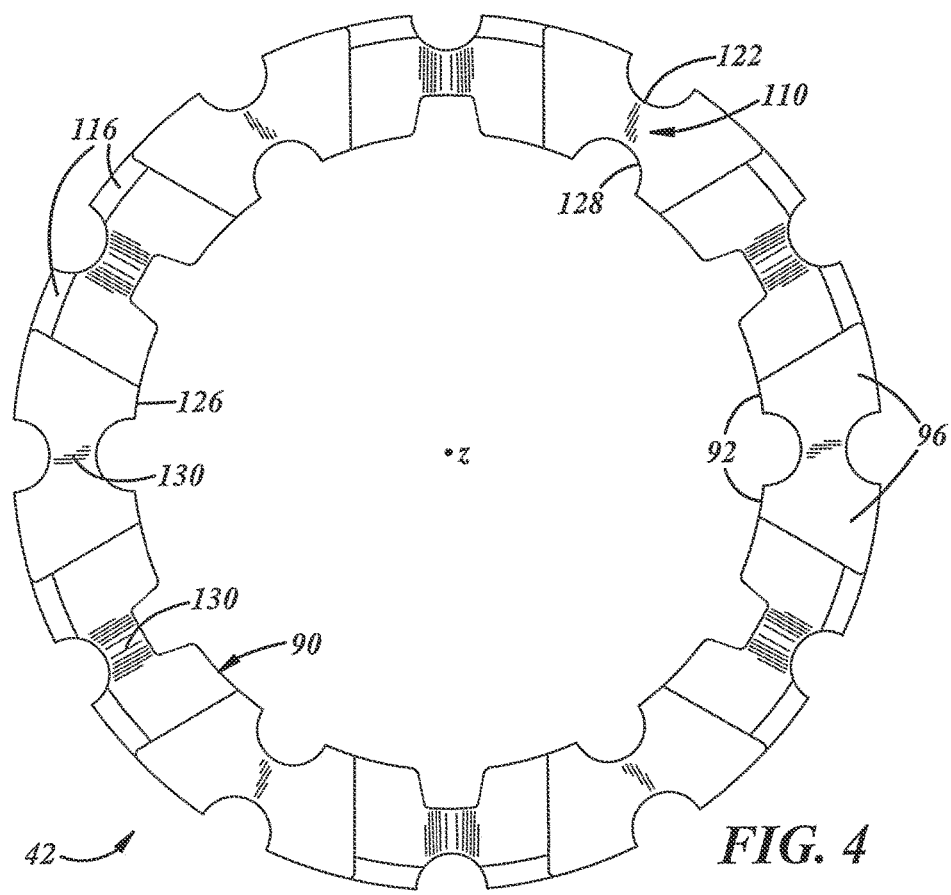
FIG. 4 is a bottom view of the insert shown in FIG. 2.
Figure 5:
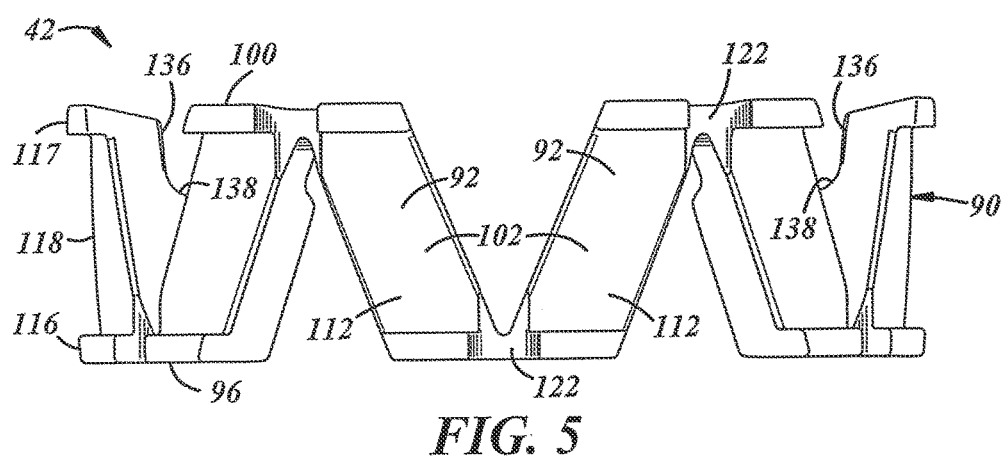
FIG. 5 is a side view of the insert shown in FIG. 2 along line 5-5 of FIG. 3.
Figure 6:
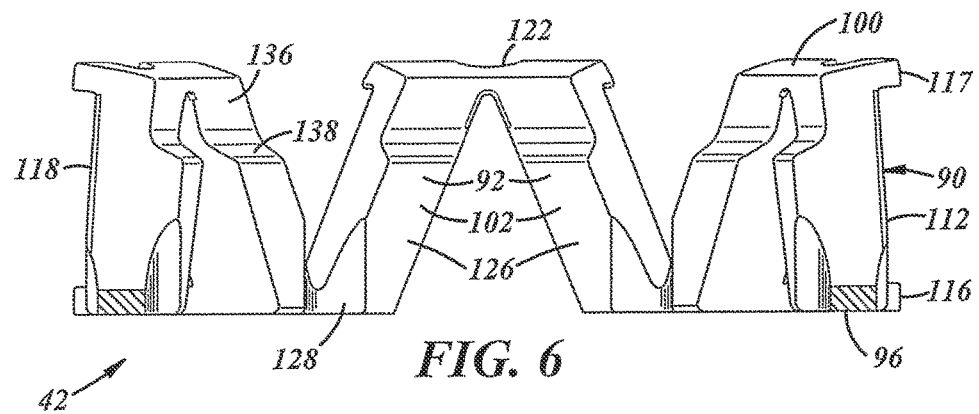
FIG. 6 is a sectional view of the insert shown in FIG. 2 taken along line 6-6 of FIG. 3.

A constant velocity (CV) joint 10 is shown in FIG. 1. The constant velocity (CV) joint 10 may comprise an outer race 12 and an inner race 14 pivotally coupled to one another and arranged to define multiple ball tracks 16 for carrying a plurality of balls 18. On one end of the CV joint, a grease cap 26 may be fitted to the outer race 12 for retaining a grease or other suitable lubricant within the CV joint 10 and inhibiting contaminants from entering the joint. The CV joint may be any type of constant velocity joint, such as a plunging tripod, a fixed tripod, and the like. As will be described below, the CV joint 10 includes a boot 30 having a vent insert 42.

The CV joint 10, and more specifically the inner race 14, may be coupled to a proximate end 17 of a stub shaft 24 (e.g., via splines 15). The stub shaft generally may have a solid (or hollow) cylindrical body 48 and may be used to connect other driveline components at a distal end 52. The body 48 may include a circumferential recess or groove 50 therearound extending radially inwardly from a first portion of an outer surface 74 of the shaft body 48. The groove 50 may include a bottom 56 and two beveled edges 54, 58 on either side of the groove bottom 56.

The CV joint 10 further may include a boot assembly that includes a boot can 28 and the boot 30. The boot can 28 may be coupled to the outer race 12 at one end 27 and extend axially to a free end 29. The free end 29 may be spaced radially outwardly from the shaft 24 and be coupled to the boot 30.

One end of the boot 30 may be coupled to the free end 29, and an opposing end of the boot, which may terminate at a boot lip 68, may be sealingly engaged to the shaft 24. Thus, a body portion 60 of the boot 30 may radially and axially extend between the boot can 28 and the shaft 24 defining a primary chamber 44 between the boot 30 and the shaft 24 enclosing a portion of the outer and inner races 12, 14, the ball tracks 16, and the balls 18. Together, the cap 26, boot can 28 and the boot 30 may retain the grease around the moving components of the CV joint 10 and inhibit contamination thereof.

The boot 30 may include a neck portion 40 with an inner diameter that may approximate a diameter of the stub shaft 24, so that an inner surface 62 may be closely received over a portion of the stub shaft. The inner surface 62 may include a circumferential protrusion 64 extending radially inwardly that may be at least partially received in the stub shaft groove 50 and have a size and shape that may complement the size and shape of the groove 50.

One or more vent passages 70 (see FIG. 7) may extend through the protrusion 64 in the boot neck portion 40. In some implementations, these vent passages 70 may define channels on or in the inner surface 62 of the neck portion 40 in the vicinity of the protrusion 64. Examples of these vent passages include one or more circumferentially extending passages 70a (or at least partially a circumferentially-extending passage) and one or more axial or longitudinal passages 70b in communication with and branching from the circumferentially extending passage(s) 70a.

Some of the longitudinal passages 70b may extend axially from a primary chamber 44—on one side of the protrusion 64—to the circumferential passage 70a. Other longitudinal passages 70b may extend axially from the circumferential passage 70a to an opposite side of the protrusion. According to at least one embodiment, three longitudinal passages 70b extend from the primary chamber 44 to the circumferential passage 70a and may be circumferentially offset from each other (e.g., circumferentially spaced approximately 120° from one another) and three longitudinal passages 70b extend from the circumferential passage 70a to the opposing side of the protrusion (e.g., also circumferentially spaced approximately 120° from one another). Moreover, in at least some implementations the first three longitudinal passages are not circumferentially aligned with the second three longitudinal passages.

The opposite side of the protrusion 64 may open to an overpressure chamber 46 defined between the protrusion 64 and lip 68 and a radially outwardly extending circumferential bulge 72 in the inner surface 62 of the neck portion 40. In addition, the overpressure chamber 46 may be in communication with at least some of the longitudinal passages 70b (e.g., the second three passages noted above).

Figure 7:
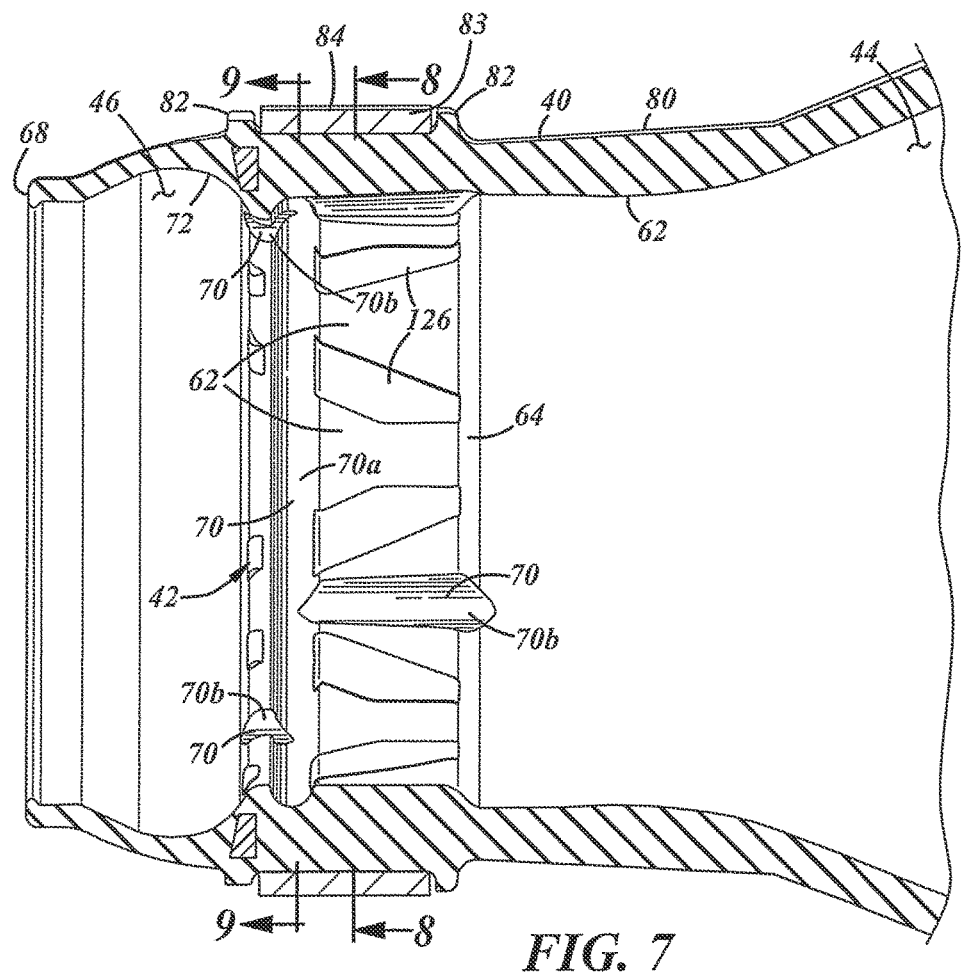
FIG. 7 is a partial sectional view of a boot of the constant velocity joint shown in FIG. 1.

An outer surface 80 of the neck portion 40 may have two axially spaced and circumferentially extending flange portions 82. The flange portions may extend radially outwardly from the surface 80 and the axial spacing between the two flange portions 82 may define a circumferential channel 83. The channel 83 may be sized to receive a clamping device or retainer 84 (e.g., a hose clamp) as best shown in FIG. 7.

To improve the interface and connection between the boot 30 and the stub shaft 24, the boot 30 may carry the vent insert 42 in the neck portion 40. For clarity, FIGS. 2-6 show one illustrative embodiment of the vent insert 42 and the insert is shown in these views without the boot 30.

The vent insert 42, in at least some implementations, may include an annular body 90 having multiple connected segments or supporting portions 92 defining a zig-zag or serpentine configuration. As such, in this implementation, each segment extends axially between first and second ends and is inclined in the circumferential direction so that two connected together segments 92 define a "V" shape (as shown, alternating "V" and inverted "V" shapes). In at least some implementations, the segments are all canted or inclined at the same or similar angles, have the same axial length, have the same circumferential thickness, and are spaced equally radially from a Z-axis although these things are not required and are merely representative of some embodiments. In at least some implementations, the segments may be inclined at an angle of between 2.5 and 50 degrees relative to the Z-axis, with consecutive segments inclined in alternating directions providing an included angle between adjacent segments of between 5 and 100 degrees. Further, in the example shown, there are twelve (12) interconnected segments 92 shown but more or fewer segments may be used.

Figure 9:
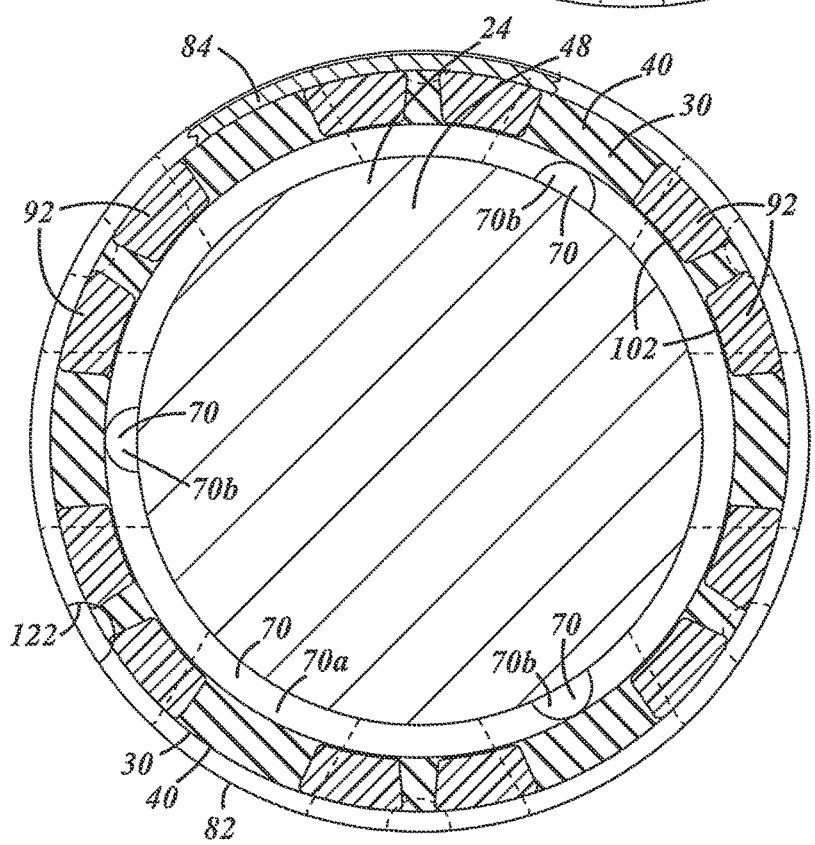
FIG. 9 is a sectional view taken along line 9-9 of FIG. 7.

The illustrated segments 92 are generally trapezoidal in shape (see e.g., FIG. 9) and have a radial thickness that may be generally the same throughout a body 102 of the segments. However, returning to FIG. 2, at axial ends 96, 100 of each segment 92, the radial thickness may narrow at a node or flex feature 110 between two segments 92. The flex feature may include or be defined at least in part by an inwardly extending notch or weakened portion 122 provided in an outer surface 112 of the insert 42 and an outwardly extending notch 128 in an inner surface 126 of the insert 42. The notches 122, 128 may be circumferentially aligned or offset, or both. In the illustrated embodiment, the notches are shown as all being circumferentially aligned. Further, according to at least one embodiment, the notches 128, 122 may be approximately the same size and depth as one another. And the notches 122, 128 may be provided at one or both axial ends 96, 100 of the segments. In the implementation shown, the notches 122 are provided at both ends 96, 100 of the segments 92 while the notches 128 are provided at only end 96 of the segments. As shown in the embodiment, the notches 122, 128 can be partial circles extending axially (as best seen in end views of FIGS. 3 and 4). However, other axial or longitudinal geometries are possible.

One or more of each segment 92 may include a flange 116 extending radially outwardly at the axial end 96 and another similar flange 117 extending radially outwardly at the axial end 100. The axial spacing of the flanges 116, 117 may define a channel 118 on the outer surface 112. In addition, the notches 122 may extend radially inwardly from a portion the flanges 116, 117, and may also extend partially into the segment bodies 102.

According to one embodiment, a radial thickness of a thinner portion or flexible portion 130 (defined by the remaining material between the notches 122 and 128) may be between 5% and 80% of the radial thickness of the segment bodies 102, and the thickness may depend on, for example, the properties of the insert material. And according to one embodiment, the remaining thickness of the thinner portion 130 may be between 5% and 50%. As will be described below, this thinner portion 130 may facilitate radially flexing (e.g. expansion and/or contraction) of the vent insert 42 at the nodes 110.

In at least one embodiment (see FIGS. 2, 3, 5), instead of a notch 128 at the inner surface 126 of the axial end 100, there may instead be a recess 136. The recess may extend circumferentially and axially beyond the node 110 and in the implementation shown, extends circumferentially across each segment 92 and extends axially between the axial end 100 and a lip 138 on the inner surface 126.

Figure 8:
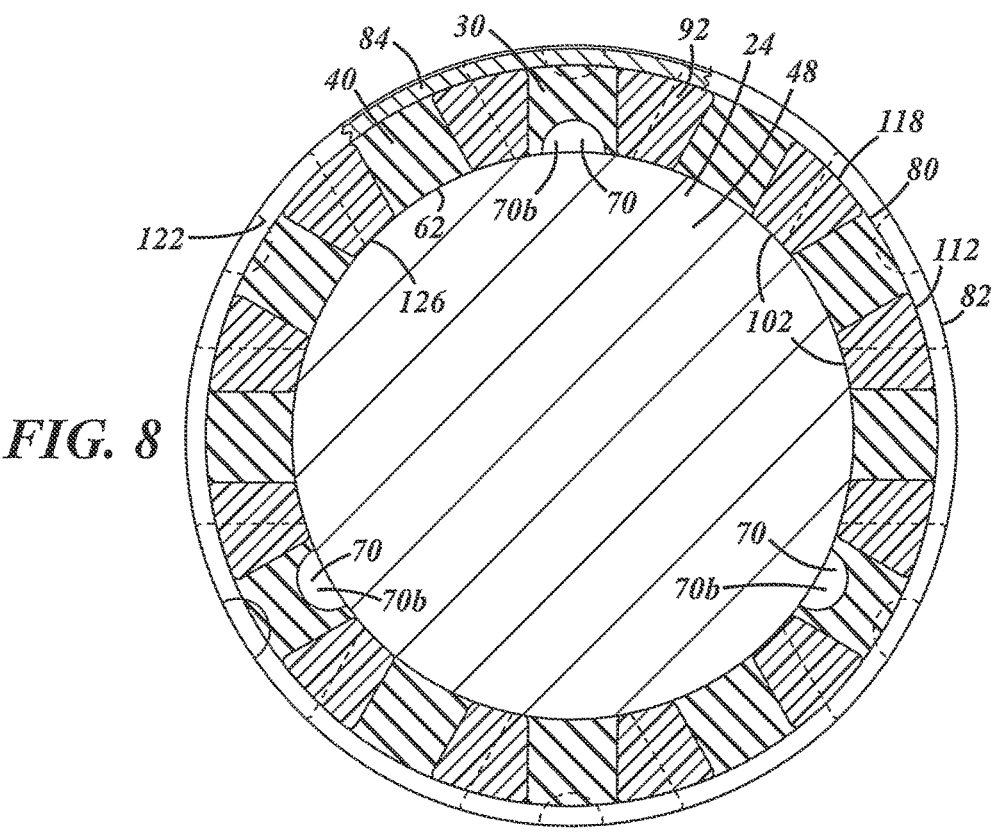
FIG. 8 is a sectional view taken along line 8-8 of FIG. 7.

As previously discussed (see FIGS. 7, 8 and 9), the boot 30 carries the vent insert 42 in the neck portion 40. More specifically, the vent insert 42 is located within the protrusion 64 and has axial end 96 closer the boot can 28 and axial end 100 closer the lip 68 of the boot 30. In addition, the vent insert 42 may be at least partially overmolded and embedded within the material of the boot when the boot is molded or otherwise formed.

As shown in FIG. 7, the flange portions 82 on the outer surface 80 of the boot may coincide with the flanges 116, 117 (see e.g., FIG. 5) of the vent insert 42. In one implementation, a marginal or negligible amount of boot material may cover or overlay the flanges 116, 117. In other implementations, more material may cover the flanges or the flanges may protrude from the boot material at the outer surface 80 (i.e., the flange portions 82 may be defined only by the flanges 116, 117).

Similarly, the circumferential channel portion 83 on the boot's outer surface 80 may coincide with the channel 118 on the outer face 112 of the vent insert 42. The channel portion 118 may be exposed or may be overlaid with any desired amount of boot material.

Turning to the inner surface 62 of the boot's neck portion 40, the inner surface may be generally flush with the inner faces 126 of the vent insert annular body 90. The inner faces 126 may be exposed or may have a marginal or any desired amount of boot material thereover. This is best shown in FIG. 7 where the inner faces 126 are exposed and not covered by the boot material.

The vent insert 42 may be oriented with respect to the boot 30 so that the segments 92 do not interfere with the vent passages 70 in the protrusion 64 of the boot. In at least some implementations, this may be facilitated by aligning the inwardly-facing notches 128 with the longitudinal passages 70b (FIG. 7). And the recesses 136 may coincide with the circumferential passage 70a.

The manufacture of the boot 30 may include a two-phase molding process. For example, in the first phase, the vent insert 42 may be manufactured by a molding process. And according to one implementation, the recesses 136 may enable the insert 42 to be more easily withdrawn from the mold. However, the recesses 136 are not necessary and if a void is desired in that area to avoid or limit interference with a vent passage, the vent insert 42 may have inwardly-facing notches 128 at both axial ends 96, 100. In the second phase, the boot 30 may be manufactured by an insert-molding process. For example, the vent insert 42 may be located in a different mold, and the boot material may be formed around and/or over the vent insert 42. Some of the features of the insert 42 (e.g., the "V" shape of the interconnected segments 92 and at least some of the notches 128, 122) may facilitate the adhering of the boot material to the vent insert during assembly and provide robustness during use. In addition, the notches 122, 128 suitably may facilitate the flow of molten boot material during the overmolding process.

The vent insert 42 may be comprised of any suitable material that preferably is more rigid or stiffer than the material of the boot 30. Non-limiting examples of vent insert material include: thermoset polymers such as glass-filled polyesters or polyurethanes; phenol-formaldehyde; Duroplast™; urea-formaldehyde; melamine resin; epoxy resin; polyimide; polyester resin or cyanate esters; and elastomers that maintain dimensional stability up to 120° C. Thus, the boot material may include any suitably softer and/or more pliable material than that used to mold the vent insert. Non-limiting examples of the boot material include a urethane material or a hydrogenated nitrile butadiene rubber (HNBR); however, other materials are possible. For example, one embodiment may include boot material that comprises HNBR HSB5. In at least one embodiment, the stiffness of the vent insert material may approximate a "D60" on the Shore durometer scale; e.g., the vent insert material may be approximately 50% stiffer than that of the boot material.

Assembly of the boot 30 on the CV joint 10 may include attaching or coupling one end of the boot to the free end 29 of boot can 28 and sliding the neck portion 40 of the boot over the stub shaft 24. The pliability of the boot material may allow the neck portion to stretch over the shaft 24 and seat the protrusion 64 into the circumferential groove 50 of the shaft. Moreover, the inwardly- and outwardly-facing notches 128, 122 of the overmolded vent insert 42 may allow the vent insert 42 to flex as the neck portion is positioned on the shaft (e.g., desirably expanding and contracting with the neck portion 40).

Once the protrusion 64 is positioned in the groove 50, the retainer 84 may be placed in the circumferential channel portion 83 on the outer surface 80 of the neck portion 40. The retainer may provide inwardly-directed forces primarily to the outer faces 112 of the vent insert (in channel 118). In turn, these forces may be communicated to the inner faces 126 of the vent insert which press against the bottom surface 56 of the groove 50 in the stub shaft 24.

When the boot is installed on the stub shaft 24, the boot lip may engage and seal against the shaft first sealing surface 74 (e.g., at low speeds or when the shaft is at rest). Thus, the overpressure chamber 46 may no longer be in direct communication with the ambient environment. Instead, the overpressure chamber 46 may be in communication with the primary chamber 44 via the passages 70. However, in at least some implementations, internal pressure in excess of the boot lip 68 cracking pressure will lift the boot lip 68 to allowing the excess pressure to vent from the inner chamber 44. If the external pressure is above the internal pressure the boot lip 68 will remain sealed until the CV joint 10 is rotating at speed, the boot lip 68 is lifted from the stub shaft by centrifugal force allowing pressure equalization between the ambient environment and the inner chamber 44.

As the notches 122, 128 were positioned in the boot's neck portion 40 to coincide with the longitudinal passages 70b and as the recesses 136 were positioned to coincide with the circumferential passage 70a, the clamping load applied to the vent insert 42 does not unduly compress the boot in the area of the vent passages 70 so that the flow area of the passages remains suitably open. Therefore, at least one passage 70 enables the primary and overpressure chambers 44, 46 to communicate.

Thus during use, the boot is configured to accommodate an overpressure scenario as temperatures rise at and/or in the CV joint 10. Temperature within the boot 30 may be elevated due to internal friction generated by the CV joint 10 itself or by external heat sources (e.g., a vehicle engine or exhaust system). It will be appreciated that as the temperature increases within the sealed primary chamber 44 of the boot 30, the pressure in the chamber 44 increases as well. To relieve this pressure, air within the primary chamber 44 may pass to the overpressure chamber 46 via the passages 70. And as the pressure decreases within the primary chamber 44, the air from the overpressure chamber 46 may return to the primary chamber.

According to the present disclosure, pressure equalization may occur even when one or more of the passages is blocked—e.g., by grease. A grease obstruction may occur when the passage (e.g., one of the longitudinal passages 70b) is located at the bottom of the shaft 24—e.g., when the vehicle is parked in that position. Here, grease may flow therein and at least partially obstruct that particular passage 70. Or when grease flows out at a later time, some residual grease may dry within the passage and cause an obstruction or blockage (regardless of the shaft's position). However, since the boot may have multiple longitudinal passages 70b, it is probable that one or more other passages 70b will be unobstructed allowing pressure to escape from the primary chamber 44 to the overpressure chamber 46. Were this not the case, a single blocked passage in the boot may cause a boot blow-out or burp in a high pressure scenario as air and/or grease is forced to suddenly expel from the boot (e.g., forced between the protrusion 64 and the shaft's sealing surface 56 and/or between the boot's lip 68 and the shaft's sealing surface 74). Thus, the multiple-passage 70 embodiment may inhibit or prevent this scenario. Moreover, grease is less likely to escape the primary chamber 44 by slower leakages as well—since in at least one embodiment, the first longitudinal passages 70b (nearer the primary chamber 44) are angularly offset from the second longitudinal passages 70b (nearer the overpressure chamber 46). Thus, even if grease enters one of the longitudinal passages 70b on one side of the circumferential passage 70a, it is unlikely to reach one of the longitudinal passages 70b on the opposing side of the circumferential passage 70a. Moreover, any grease in the longitudinal passage 70b may be returned to the primary chamber 44 via centrifugal forces when the shaft 24 is rotated at normal or typical speeds.

In addition, the boot 30 with the overmolded vent insert 42 prevents collapse or closure of the passages 70 during this use due to the clamping load of the retainer 84. In the present disclosure, the clamping load is applied at least somewhat directly to the insert 42, and the insert is comprised of material(s) suitably rigid to bear the load thereby retaining the stiffness of the boot 30 in the neck portion 40. Thus, the vent passages 70 are not unduly compressed or restricted as the vent insert does not appreciably compress—with respect to the compressibility of the boot material. In some embodiments, the vent insert 42 may prevent relaxing of the clamping load in extremely cold temperature environments. For example, it will be appreciated that some of the boot material may be squeezed from or outwardly moved from under the retainer 84 when the retainer applies the clamping load—especially in a boot that does not include insert 42. It will be appreciated that when the boot material is displaced outwardly by the clamping load, a large portion of this displaced-material will recover or contract when the clamping load is removed. However, this recovery or contraction does not occur similarly at cold temperatures. For example, at extreme cold temperatures the elastomeric properties of the boot material may be suspended (e.g., at approximately −30° C.). And at further extreme cold temperatures, the volume of the boot material may be reduced or lessened (e.g., at −40° C.). It will be appreciated that the reduced boot material volume may enable the boot to twist and become creased during rotation ultimately damaging and even rupturing the boot (i.e., without the insert 42). However, in implementations of the boot having the vent insert 42, rupture may be inhibited. The thermally-stable properties of the insert 42 (e.g., the properties of a thermoset) may sufficiently inhibit the volumetric reduction of the boot material (at least at the neck) and thus the relaxation of the clamping load by the retainer 84. Thus, the insert may enable the boot to be exposed to temperatures less than −30° C. without twisting, creasing, or rupturing.

Without the vent insert 42, the clamping load may collapse the vent passages 70 against the stub shaft 24. Even if the clamping load is not excessive—e.g., over-tightening the retainer 84 and immediately restricting the passages 70—over time the clamping load may restrict the passages 70. For example, the boot material may flow or creep over time in response to the applied clamping load. Moreover, this material creep may be accelerated in higher temperature environments.

As discussed above, the inner and outer faces 126, 112 of the vent insert 42 may be bare, that is, not covered by boot material. Therefore, since no clamping load is applied to the boot material in such a scenario, no or little boot material creep occurs. Even in instances where a marginal amount of boot material overlays the faces 126, 112, 42, there will be no appreciable amount of material creep since the quantity/thickness of material being compressed is negligible.

Other embodiments of the vent insert are also possible. For example, in one implementation, the thinner portion 130 (at the nodes 110) is absent; i.e., the vent insert comprises a plurality of segments 92 that may be arranged in any desired pattern, but which are not coupled to one another (or at least some are not coupled to one another). The thus-arranged segments 92 then may be overmolded at the neck portion 40 of the boot 30, and since no vent insert material exists at the nodes, the vent insert may still allow flexing (e.g. radial expansion and contraction) while also reserving the load-bearing properties of the illustrated embodiment.

Figure 10:
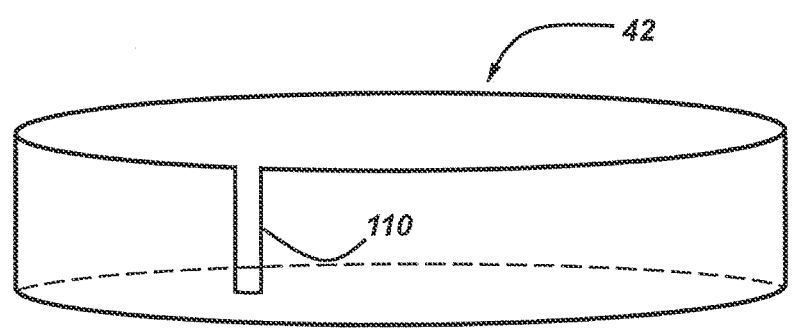
FIG. 10 is a side view of an additional embodiment of the vent insert for the boot of the constant velocity joint.

The insert may include one or more flex features 110 that permit some expansion of the insert. In some implementations, the flex feature(s) may include thinner sections of material, like those already described, and in other implementations (e.g., FIG. 10), the flex feature may be defined by a slot 110 partially or completely through the insert such as in a split-ring where the insert is not circumferentially complete or continuous. Where the slot is completely through the insert (as illustrated by the dashed lines that extend from the partial slot 110 shown in FIG. 10), the insert may be considered generally c-shaped, although the ends of the insert may be very close to each other if desired. In some implementations, the insert may be defined in multiple pieces, with breaks or gaps between adjacent pieces, and each piece may be at least partially overmolded in the boot so the boot and insert may be handled as a single unit, if desired. The insert may be formed in one piece or more than one piece.

Thus, there has been disclosed a vent insert adapted to be overmolded by a boot for a constant velocity (CV) joint. The vent insert may, in at least some implementations, be flexible, annular and located in a neck region of the boot to bear the clamping load of a clamp securing the boot to its respective stub shaft. The characteristics of the vent insert may ensure that vent passages within the boot are not undesirably restricted due to over-clamping or creep of the boot material.

Figure 11:
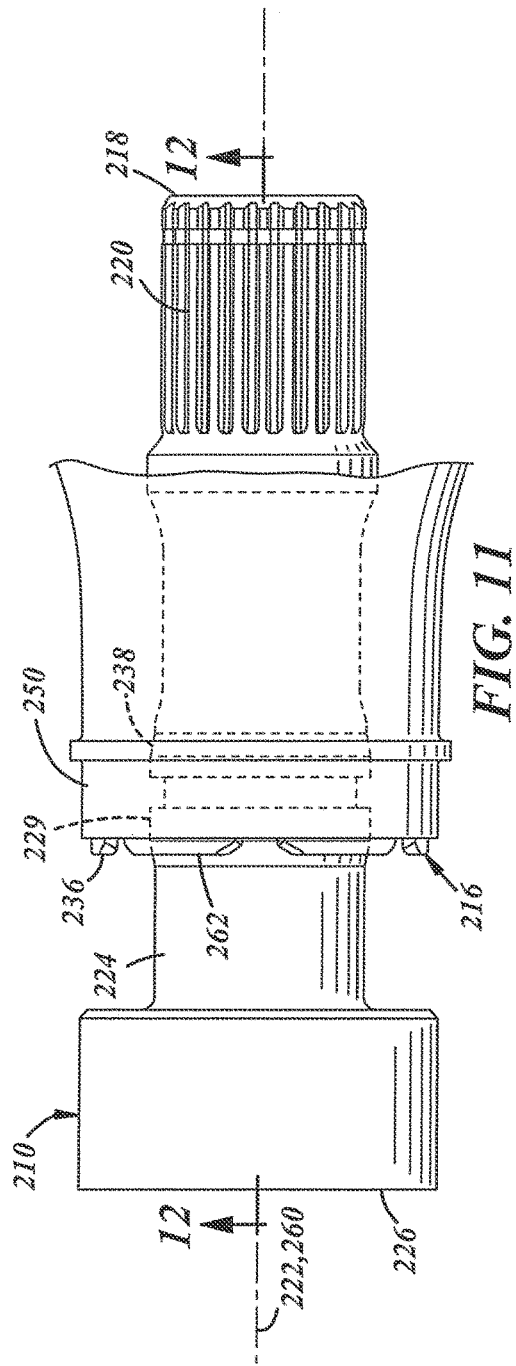
FIG. 11 is a side view showing a boot assembly with a boot and an integrated retainer installed on a shaft used with a constant velocity joint.
Figure 14:
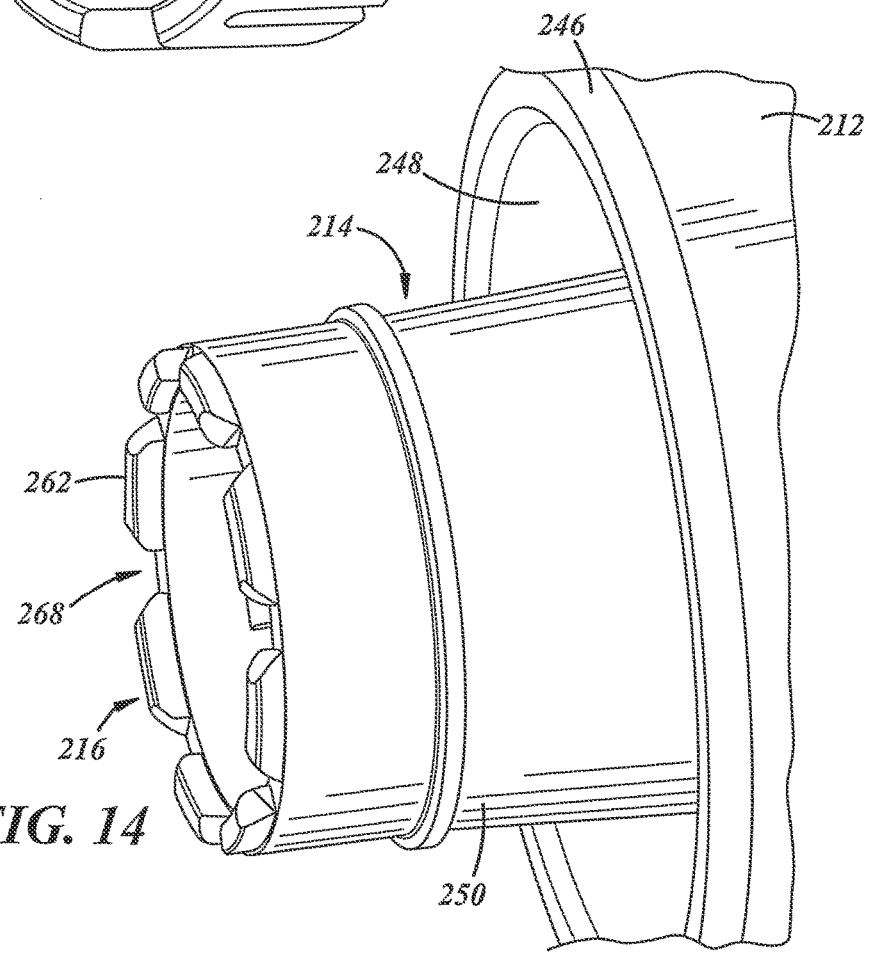
FIG. 14 is a fragmentary perspective view of the boot assembly.
Figure 15:
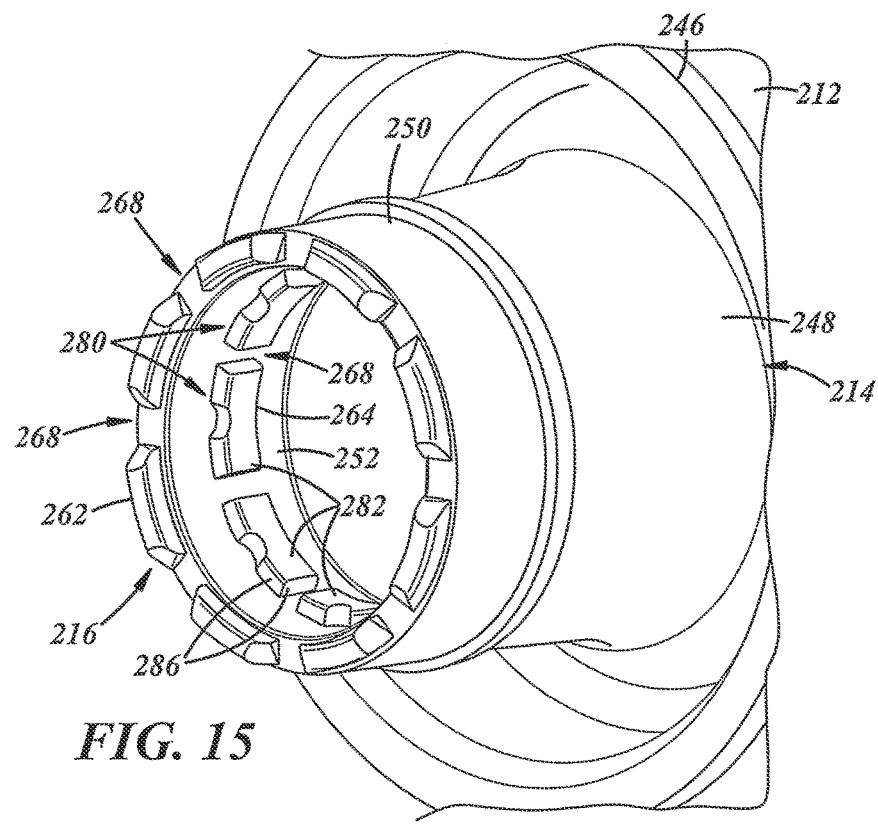
FIG. 15 is another fragmentary perspective view of the boot assembly showing an inner surface of the boot.

FIG. 11 illustrates a shaft 210 adapted to be coupled to a constant velocity joint 212 (only a portion of which is shown in FIGS. 14 and 15). The shaft 210 is partially covered by a boot assembly 214 that includes an integrated retainer, clip or insert 216 and which may be coupled to the shaft 210 and the CV joint 212. The CV joint 212 may be any type of constant velocity joint, such as a plunging tripod, a fixed tripod, and the like. The CV joint 212 may be of conventional construction and will not be further described herein.

Figure 16:
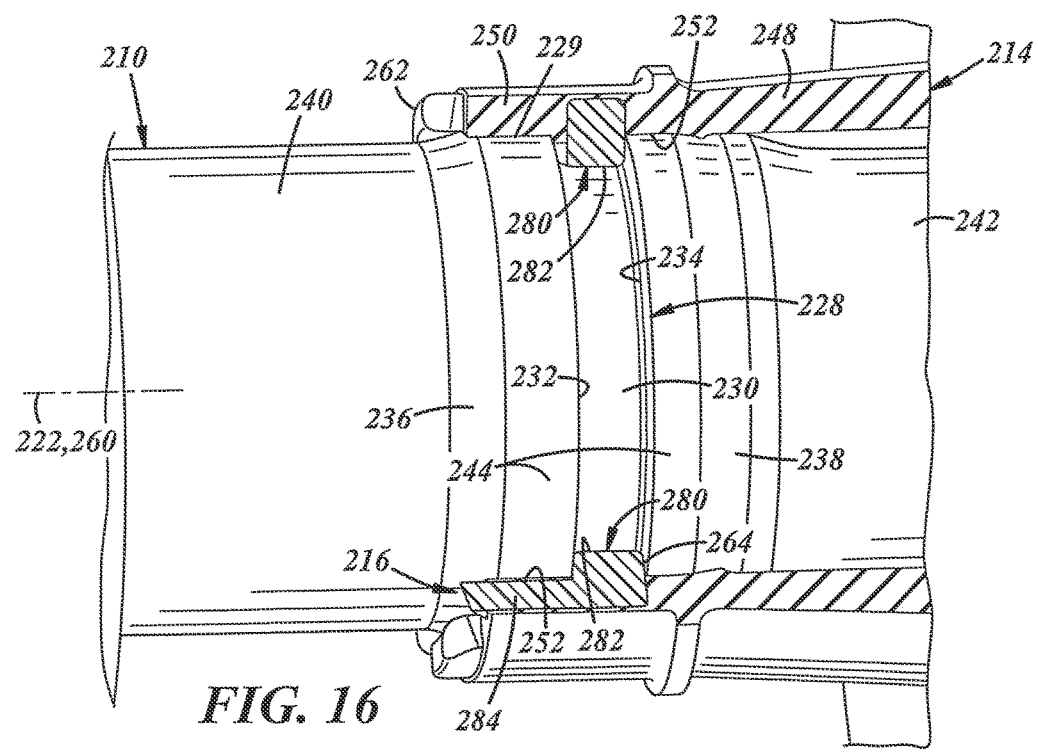
FIG. 16 is a fragmentary sectional view of the shaft with the boot assembly installed.

A proximate end 218 of the shaft 210 may be coupled to the CV joint 212 (e.g., via splines 220) and the shaft may rotate about an axis 222 to transfer torque between linked components. The shaft 210 generally may have a solid (or hollow) cylindrical body 224 and may be used to connect other driveline components at a distal end 226. The body 224 may include a boot location or retention feature, which in some implementations may be a recess or groove 228 formed in the shaft 210. In the example shown, the groove 228 extends completely circumferentially around the shaft 210 although this is not required. As shown in FIG. 16, the groove 228 extends radially inwardly from an outer surface 229 of the shaft body 224 to a bottom surface 230. The bottom surface 230 may extend axially any desired length and may be uniformly radially spaced from the axis 222 of the shaft 210, if desired. In at least some implementations, the groove 228 may include two generally perpendicular side surfaces 232, 234 extending from opposed sides of the groove bottom 230 to the outer surface 229. While shown and noted as generally perpendicular, the side surfaces 232, 234 may extend at any desired angle relative to the bottom 230. And the groove 228 may otherwise have any desired shape, size and orientation.

The body 224 may also include at least one inclined surface axially spaced from the groove 228, and in the implementation shown, two inclined surfaces 236, 238 are provided, one on each side of the groove 228. The inclined surfaces 236, 238 may provide a transition from adjacent reduced diameter portions 240, 242 of the body 224 to an increased diameter portion 244 of the body, and the groove 228 may be formed in the increased diameter portion. The depth of the groove 228 may be any desired dimension and may or might not be equal to the radial extent of either or both of the inclined surfaces 236, 238.

As shown in FIGS. 14-16, at least certain implementations of the boot assembly 214 may include the retainer or insert (called a clip 216 for ease of description and without intending to limit the structure or arrangement of the retainer), a rigid boot can 246 (e.g. formed from metal) and a flexible boot 248 which may include a roll, bellows or other flexible feature to accommodate relative movement of the shaft and CV joint. Alternatively, the boot assembly may include only the boot 248 and clip 216. The boot can 246 may be coupled to the CV joint 212 at one end and to the boot 248 at its other end.

One end of the boot 248 may be coupled to boot can 246 and an opposing end of the boot 248 may be coupled to the shaft 210. Together, the boot can 246 and the boot 248 may retain the grease around the moving components of the CV joint 212 and inhibit contamination thereof. Opposite the can 246, the boot 248 may include a neck portion 250 at least a portion of which may have an inner diameter that may approximate the outer diameter of the shaft 210, so that an inner surface 252 may be closely received over a portion of the shaft 210.

In at least some implementations, the boot 248 is made of a flexible polymeric material that defines the majority of the boot 248 and an insert integrated into or otherwise carried by the boot 248. In at least some implementations, the insert is received in or adjacent to the boot neck 250 and includes or is defined by the clip 216 that secures the boot 248 to the shaft 210. The clip 216 may be formed from a more rigid material than the material of the boot 248 to facilitate a firm connection between the boot 248 and shaft 210.

Figure 12:
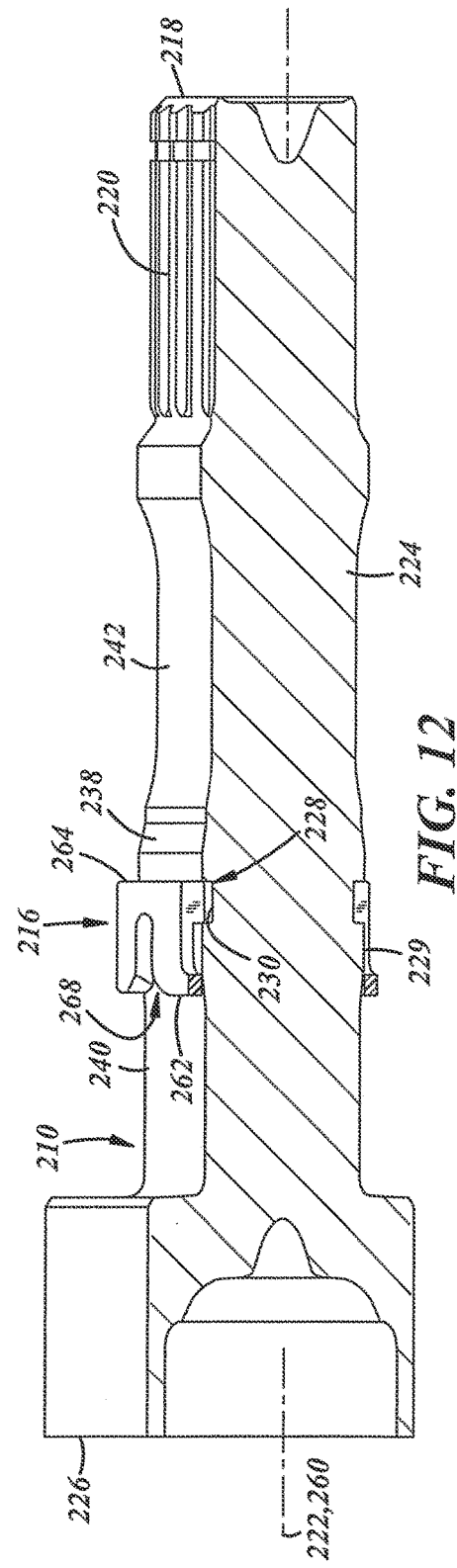
FIG. 12 is a cross-sectional view taken generally along line 12-12 in FIG. 11 with the boot removed.
Figure 13:
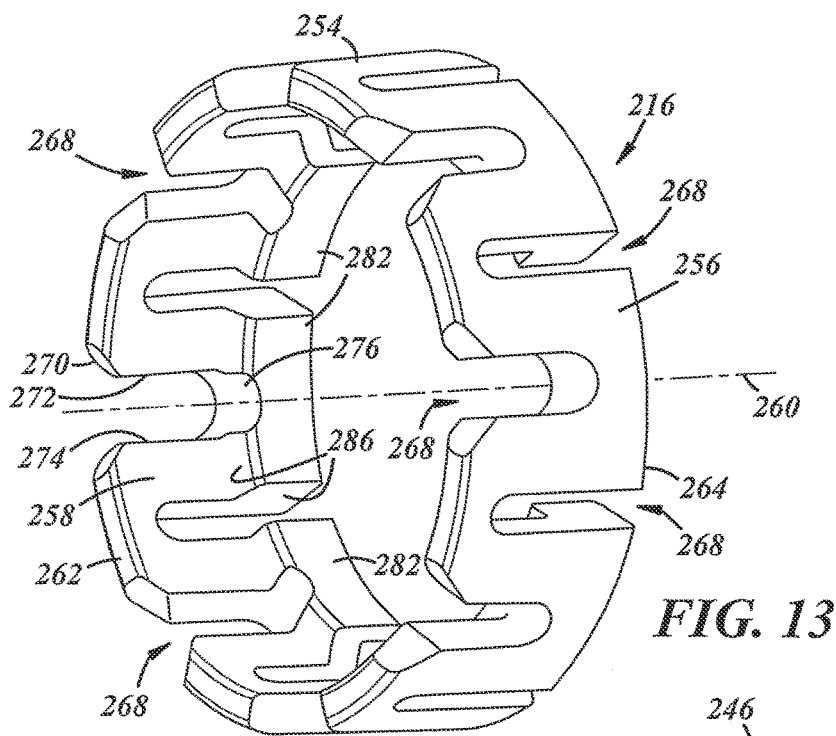
FIG. 13 is a perspective view of the retainer.

The clip 216, in at least some implementations such as shown in FIGS. 12 and 13, may include an annular body 254 having an outer surface 256 facing away from the boot inner surface 252 and an inner surface 258 facing toward and/or defining at least part of the boot inner surface 252. The clip 216 may be generally cylindrical and symmetrical about a center axis 260 in at least some embodiments. When assembled onto the shaft 210, the clip axis 260 may be coincident with the shaft axis 222. The clip 216 may extend axially between first and second side edges 262, 264, may have any desired radial thickness and may be circumferentially continuous (e.g. not split or c-shaped). To permit the clip 216 to expand so that it can be received over a larger diameter portion of the shaft 210 and then to contract so that at least a portion of the clip 216 is received in the shaft groove 228, the clip 216 may be formed from an at least somewhat flexible and resilient material.

In at least some implementations (such as is shown in the drawings), the clip 216 is not a solid, cylindrical band or ring of constant dimension (e.g. radial thickness, axial width, or both). Instead, the clip 216 includes one or more flex features designed to improve flexibility of the clip 216, such as weakened areas which may include voids 268 formed in or through the clip 216. The voids 268 or other features may be circumferentially spaced apart and distributed about the clip 216 in any desired way. In the example shown, the voids 268 extend radially through the clip 216, through a majority of the axial width of the clip 216 and for any desired circumferential extent. In the example shown, and as indicated for one void 268 in FIG. 13, the voids 268 are generally U-shaped with an open end 270, and are defined by parallel side walls 272, 274 and a bottom wall 276 spanning the side walls at a closed end. While shown as having an axial length greater than their circumferential width, and with parallel side walls 272, 274, the voids 268 may have any desired size and shape. Further, in at least some implementations, each side edge 262, 264 is interrupted by at least one void 268 such that the side edges are not a continuous circle of material. In the example shown, consecutive voids 268 are open to or at opposite side edges 262, 264 of the clip 216. Hence, every other void 268 opens to side edge 262 and the other voids 268 open to side edge 264. This provides a serpentine configuration for the clip 216 that may expand more readily than it would if the clip 216 were formed as a solid, cylindrical clip 216. Of course, one or both side edges could be circumferentially continuous, if desired.

To improve retention of the boot assembly 214 relative to the shaft, the clip 216 may include one or more projections 280, such as one or more tabs or flanges. In the implementation shown, an inner surface 282 of the projections 280 defines a radially innermost portion of the inner surface 258 of the clip 216, and extends inwardly relative to an adjacent portion 284 of the clip 216. In this way, the inner surface 258 of the clip 216 is not at a constant radial distance from the axis 260. As shown, the outer surface 256 of the clip 216 is at a uniform distance from the axis 260 and the projections 280 are shown as defining a thicker region of the clip 216, but this is not required. Also, in at least some implementations, the clip 216 has an axial width that is greater than the axial width of the groove 228. As set forth in more detail below, the projections 280 are adapted to be at least partially received within the shaft groove 228 and may have an axial width less than the axial width of the groove 228 and a radial extent equal to or less than the radial depth of the groove 228. And the projections 280 may be axially aligned about the inner surface of the clip 216 so that each projection may be received within the groove 228 when the boot assembly 214 is installed onto the shaft. In at least some implementations, the projections 280 are located adjacent to and may define one side edge 264 of the clip 216, although the projections 280 could be spaced axially inwardly from both side edges 262, 264 if desired. Also, while the voids 268 may extend axially part of the way into the projections 280, this is not required. Further, the projections 280 could be circumferentially continuous and not separated by the voids 268, if desired.

As previously discussed, the clip 216 may be integrated into or carried by the boot 248, such as in the neck portion 250. In at least some implementations, the clip 216 may be at least partially overmolded and embedded within the material of the boot 248 when the boot 248 is molded or otherwise formed. In this way, the clip 216 may be completely covered by the material of the boot 248, or one or more portions of the clip 216 may be exposed or stick out from the boot material. In at least some implementations, the projections 280 may extend radially inwardly from the boot 248 and define a minimum diameter portion of the boot 248, at least in that area of the neck 250. In this way, the projections 280 may be directly received within the shaft groove 228, without any of the boot material between the inner surface 282 of the projections 280, and at least a portion of the radially outwardly extending sides 286 of the projections, and the shaft 210.

In the example shown, the inner surface 282 and at least a portion of the radially extending sides 286 of the projections 280 are exposed from the inner surface of (i.e. extend outwardly from) the boot neck 250 so that the projections 280 may be directly received within the shaft groove 228 (i.e. without boot material between the inner surface 282 and the groove 228, in at least certain implementations). In the example shown, the projections 280 are polygons and are generally rectangular in cross-section with each of the four radially extending sides 286 as well as the radially inner surface 282 at least partially exposed within the boot neck 250. Other shapes are possible for the projections, including polygons (in cross-section) having more or fewer the four sides, with a radially extending perimeter bounding the inner surface of the projections. Also in the example shown, the side edge 262 of the clip 216 is exposed from the boot 248, and extends axially outwardly at one end of the neck 250, although this is not required. Because that side edge 262 is not continuous, it appears as discrete, spaced tabs extending from the end of the boot neck 250. Hence, the projections 280 may be axially spaced from an end of the boot 248 by a desired distance.

As shown in FIGS. 11 and 16, the boot assembly 214 may be received over the shaft 210 with the boot neck 250 in the region of the shaft groove 228. As the boot 248 is moved over the shaft 210, the projections 280 will initially be received over the reduced diameter portion 242 of the shaft 210, and then will engage the inclined portion 238. In order for the boot 248 to be moved further relative to the shaft 210, the clip 216 must expand radially outwardly and, at least temporarily, have an increased inner diameter compared to its inner diameter at rest (expanded state vs. at rest state). When the projections 280 are axially aligned with the shaft groove 228, the resilient nature of the clip 216 material causes the clip 216 to radially contract with the projections 280 received within the groove 228. The material of the clip 216 may be rigid enough to retain the projections 280 within the groove 228 under normal forces experienced in use of the CV joint 212. The boot material may include a polymeric material of high durometer and low compression set (i.e. drift), but which is flexible enough to allow the radial expansion over the shaft and to contract into the location feature (e.g. the groove) on the shaft. The retention force of the boot relative to the shaft would have to combat the maximum centrifugal load generated by the rotational speed of the shaft and the mass of the boot neck at this point. While noted herein as being a polymeric material, the boot material is not limited to an engineering polymer—a steel structure with suitably designed flexural features could also be used and provide the flexibility to expand over the shaft and resilience to contract into the location feature on the shaft, and also have the low compression set (drift) capability to withstand the centrifugal force on the boot in use.

In some implementations, a clamp ring or other device (such as but not limited to a simple band or the like) may be positioned over the neck 250 in the region of the clip 216, to limit or prevent radially outward expansion of the clip 216 and maintain the projections 280 within the groove 228. Further, clamping forces that might otherwise damage the boot are not likely to be needed because the boot preferably may be retained in place on the shaft by the boot without any clamp ring or band. Hence, in at least some implementations, the ring or band may simply prevent outward expansion of the clip to retain the clip in position on the shaft, without having to also compress or squeeze the boot onto the shaft.

Further, when the projections 280 are received within the shaft groove 228, a portion of the clip 216 may overlie at least part of the enlarged diameter portion 240 of the shaft 210 outboard of the groove 228. This portion of the clip 216 may be covered at least partially by the boot material, and, if desired, the inner diameter 252 of this portion of the boot neck 250 may be slightly smaller than the outer diameter of the corresponding portion of the shaft 210. Thus, the boot 214 material between the clip 216 and shaft 210 may be in compression, providing a seal between the boot 248 and CV joint 212, if desired. In addition to or instead of this, one or more vents (e.g. an I-channel, Z-channel, etc.) can be included in this region to facilitate the buildup of or limit the pressure within the CV joint 212. In addition, the boot material on the other side of the groove 228 may also be sealed against the shaft 210, providing a seal on each side of the groove, if desired. In this regard, while the clip 216 is shown as extending in only one direction from the groove 228, the clip 216 could extend from both sides of the groove.

The clip 216 may be comprised of any suitable material that preferably is more rigid or stiffer than the material of the boot 248. Non-limiting examples of clip 216 material include: thermoset polymers such as glass-filled polyesters or polyurethanes; phenol-formaldehyde; Duroplast™; urea-formaldehyde; melamine resin; epoxy resin; polyimide; polyester resin or cyanate esters; and elastomers that maintain dimensional stability up to 120° C. Thus, the boot material may include any suitably softer and/or more pliable material than that used to mold the clip 216. Nonlimiting examples of the boot material include a urethane material or a hydrogenated nitrile butadiene rubber (HNBR); however, other materials are possible. For example, one embodiment may include boot material that comprises HNBR HSB5. In at least one embodiment, the stiffness of the clip 216 material may approximate a "D60" on the Shore durometer scale; e.g., the clip 216 material may be approximately 30% stiffer than that of the boot material.

With the clip 216 integrated into the boot 248, these components may be handled and installed as a single unit. This facilitates the assembly process compared to handling, aligning and installing two separate pieces. Further, there is no risk of misaligning or improperly installing the clip 216 relative to a boot 214 because the position of the clip 216 is assured by virtue of its being embedded at a desired location within the boot 214. Still further, proper position of the boot 214 on the shaft 210 during assembly is easier to determine as the projections 280 may snap into the groove 228 (perhaps with a click or other sound noticeable by an installer of the boot) and/or a visual expansion and contraction of the boot neck 250 may be readily observable by an installer of the boot. And because the clip 216 is integrated into and partially encapsulated within the boot material, any contraction of the boot material (e.g. due to cold weather) may also tend to contract the clip 216, rather than contracting the boot 248 away from a separate clamp ring (and hence, reducing the clamping force on the boot) as may occur in other boots without integral clips 216 and utilizing external clamp rings. Further, the clip material may also contract in the cold weather to reduce or eliminate issues of proper sealing between the boot 248 and shaft 210 in cold weather.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. For example, the terms "control" and "intermediate" used to describe the zones of the clip are not intended to impart any limitations onto the construction or arrangement of those sections of the clip and have been used for expediency in describing the clip. An "intermediate zone" could extend to and include a free end of the clip. Furthermore, all stated values (e.g., percentages, angles, ranges, etc.) are provided for illustrative purposes only and are not meant to be limiting in nature. Those skilled in the art will appreciate that in some implementations that remain within the spirit and scope of the present invention, values other than those set forth herein may be used.

The invention claimed is:

1. A boot for a constant velocity joint, comprising:
   a body having a neck portion arranged to be received on a shaft; and
   an insert formed of a different material than the neck portion where the different material is more rigid than the material of the neck portion, the insert being carried by the neck portion and having at least one flex feature including one or more voids formed in the insert to facilitate flexing of the insert so that the insert and neck portion may radially expand and contract, the insert includes a radially inner surface and at least one void extending outwardly from the radially inner surface so that a radially smallest portion of the radially inner surface is not circumferentially continuous.

2. The boot of claim 1 wherein the body defines part of a first chamber, the insert has a central axis, and the body includes a vent feature communicating with the first chamber and through which the first chamber is vented from one axial end of the insert to another axial end of the insert, wherein the vent feature is aligned with the void in the radially inner surface of the insert.

3. The boot of claim 1 wherein the insert includes an annular body having at least two interconnected segments coupled together at a node, and the node is provided in the body and configured to allow the body to radially expand, radially contract, or both.

4. The boot of claim 1 wherein the insert includes at least one projection that extends radially inwardly and is adapted to define part of an inner surface of the boot.

5. The boot of claim 1 wherein the insert defines the smallest inner diameter of the neck portion.

6. The boot of claim 1 wherein at least a portion of the insert is exposed within an inner surface of the neck region so that at least a portion of the insert may directly engage a shaft on which the boot is installed.

7. The boot of claim 1 wherein the insert is partially embedded in the boot so that portions of the insert are covered by the material of the boot and portions of the insert extend outwardly from and are exposed from the boot.

8. An insert for a boot of a constant velocity joint, comprising:
   a body having a central axis, at least two interconnected segments and at least one flex feature between the segments and including one or more voids extending radially through the body or one or more thinner sections between the segments and having a radial thickness that is less than the thickness of the segments to facilitate flexing of the body so that the body may radially expand and contract, and wherein each interconnected segment is inclined at an angle in the circumferential direction so that the at least two interconnected segments define a "V" shape.

9. The insert of claim 8, wherein the body includes at least two interconnected segments coupled together at a node, and the node is provided in the body and configured to allow the body to radially expand, radially contract, or both.

10. A boot for a constant velocity joint, comprising:
    a body defining at least part of a first chamber, having a neck portion arranged to be received on a shaft and at least one vent passage communicating with the first chamber; and
    an insert formed of a different material than the neck portion where the different material is more rigid than the material of the neck portion, the insert being carried by the neck portion and including a radially inner surface and at least one void extending outwardly from the radially inner surface so that a radially smallest portion of the radially inner surface is not circumferentially continuous, and at least a portion of the vent passage is aligned with at least one of said at least one void.

11. The boot of claim 10, wherein the body defines a first chamber and the boot also comprises a lip that defines at least part of a second chamber and wherein the first chamber is communicated with the second chamber by the vent passage.

12. The boot of claim 10, which also comprises a retainer adapted to apply a compressive force on the boot to retain the boot on a shaft and wherein the compressive force provided by the retainer is applied at least in part to the insert to limit compression of the neck portion in the area of the insert.

13. The boot of claim 10, wherein the insert is configured to radially expand and to contract, to be received over the shaft.

14. The boot of claim 10, wherein at least a portion of the insert is exposed within an inner surface of the neck region so that at least a portion of the insert may directly engage the shaft on which the boot is installed.

15. The boot of claim 10, wherein the insert includes said at least one projection which defines the smallest inner diameter of the neck portion.

16. The boot of claim 10, wherein the insert includes one or more flex features that permit radial expansion and contraction of the insert and which include one or more voids formed in the insert.

17. The boot of claim 10, wherein the insert is partially embedded in the boot so that portions of the insert are covered by the material of the boot and portions of the insert extend outwardly from and are exposed from the boot.

18. The boot of claim 10, wherein said at least one projection is adapted to be received within a boot location feature.

19. The boot of claim 10 wherein the insert has a central axis and an inner surface that is not at a constant radial distance from the axis.

20. The boot of claim 19 wherein the neck portion includes a vent passage communicating with the first chamber and the insert includes a portion of the inner surface at a greater distance from the axis than another portion of the inner surface, where the portion of the inner surface at a greater distance from the axis is aligned with the vent passage formed in the neck portion.

21. The boot of claim 20 wherein the portion of the inner surface at a greater distance from the axis is defined by a notch or recess formed in the insert.

22. The insert of claim 8, wherein each interconnected segment is inclined at an angle in the circumferential direction so that the at least two interconnected segments define a "V" shape, and wherein the inclined angle is between 2.5 to 50 degrees.

23. The insert of claim 8, wherein each interconnected segment is inclined at an angle in the circumferential direction so that the at least two interconnected segments define a "V" shape, and the at least two interconnected segments are generally trapezoidal in shape.

24. The boot of claim 1 wherein each interconnected segment is inclined at an angle in the circumferential direction so that the at least two interconnected segments define a "V" shape.

25. The boot of claim 24, wherein the inclined angle is between 2.5 to 50 degrees.

26. The boot of claim 1, wherein the at least two interconnected segments are generally trapezoidal in shape.

27. The hoot of claim 1 wherein each interconnected segment is parallel in the circumferential direction so that the at least two interconnected segments define a "U" shape.

* * * * *